BEAM STEERING APPARATUS

FIG. 2a TIMING REFERENCES

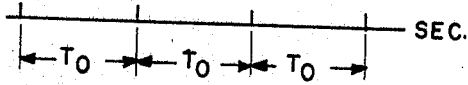

FIG. 2b ROW BEAM ANGLE SIGNALS

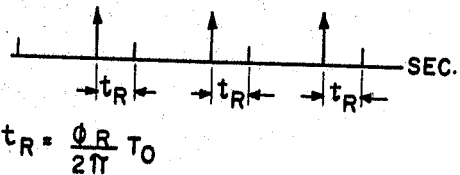

$$t_R = \frac{\phi_R}{2\pi} T_0$$

FIG. 2c COLUMN BEAM ANGLE SIGNALS

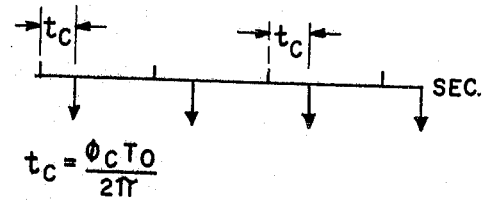

$$t_C = \frac{\phi_C T_0}{2\pi}$$

FIG. 2d SUM OF ROW & COLUMN BEAM ANGLE SIGNALS

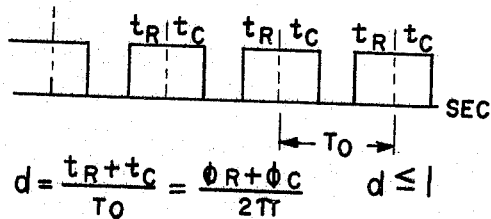

$$d = \frac{t_R + t_C}{T_0} = \frac{\phi_R + \phi_C}{2\pi} \quad d \leq 1$$

FIG. 2e SUM OF ROW AND COLUMN BEAM ANGLE SIGNALS EXCEEDING $2\pi$

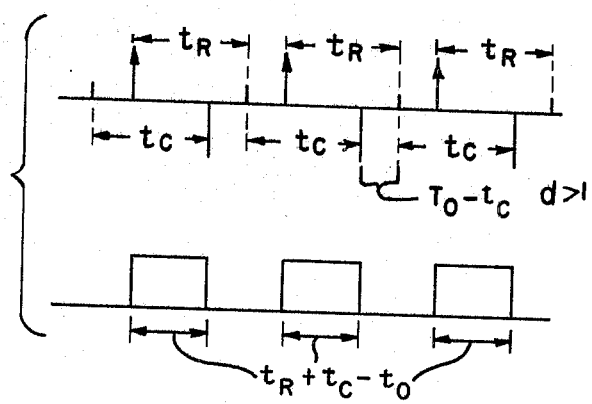

$$\frac{d = t_R + t_C - t_0}{T_0} = \frac{\phi_R + \phi_C - 2\pi}{2\pi}$$

INVENTORS
EDWARD J. SHELDON
ROSARIO MANGIAPANE
EDWIN SEGARRA

PHASE SHIFT
DRIVER D$_{ij}$

PHASE SHIFT DRIVER
WITH EXTERNAL CONTROL
NETWORK

COIL AND
SHORTED TURN

EQUIVALENT
CIRCUIT OF THE COIL

COIL DISCHARGE
WITH SHORTED TURN

INVENTORS
EDWARD J. SHELDON
ROSARIO MANGIAPANE
EDWIN SEGARRA

BY Robert Bruce Brodie
ATTORNEY

United States Patent Office 3,484,785
Patented Dec. 16, 1969

3,484,785
BEAM-STEERING APPARATUS
Edward J. Sheldon, Lexington, Rosario Mangiapane, Burlington, and Edwin Segarra, Framingham, Mass., assignors to Raytheon Company, Lexington, Mass., a corporation of Delaware
Filed May 3, 1968, Ser. No. 726,352
Int. Cl. H04b 7/02
U.S. Cl. 343—100                     2 Claims

ABSTRACT OF THE DISCLOSURE

A beam-steering apparatus in combination with a phased array antenna. The apparatus comprises a source of reference pulses of frequency $1/T_0$. Also included are means responsive to beam-steering angle magnitude signals $\phi$ for generating proportional pulse width modulated pulses such that each pulse width $$T = \frac{\phi T_0}{2\pi}$$

Additional means responsive to the modulated pulses alter the phase of the corresponding phase shift device in the phased array element with output pulses of width T when $$\frac{T}{T_0} \leq 1$$

and $T-T_0$ when $$\frac{T}{T_0} > 1$$

BACKGROUND OF THE INVENTION

This invention relates to a beam-steering apparatus in combination with a phased array antenna, and more particularly, to current drivers in combination with ferrite phase shifters in such phased array antennas.

In electronically steered phased array antennas, a plurality of individual antenna radiating elements are arranged in linear or matrix array to provide beam steering by electronic techniques. Beam steering is accomplished by altering the phase relation of signals on different radiating elements. This is instrumented by changing the corresponding phase of the phase shift device in the phased array ele-element. The phase shift devices have used a ferrite rod located within a waveguide section, in turn, surrounded by a coil. Such a system is, for example, shown in an article entitled, "Polarization Insensitivity Phase Shifter for Use in Phased Array Antennas," by Mohr and Monaghan, published in the 1967 G–MTT Symposium Digest, May 28, 1967, pages 91–94. Significantly, such devices are current responsive and require current drivers.

In matrix array, the phase shifters may alter phase by the summing of row and column beam-steering angle magnitude signals. These signals independently vary from 0° to 360° such that their sum will cover a region of approximately 720°. It is desirable to avoid driving the phase shifter greater than 360° in view of the fact that the required maximum corresponding phase shifter physical length is increased for linear operation. A signal propagated through additional distance is subject to additional loss. There is thus a need for a decision-making device at the phase shifter for determining when a selected sum exceeds 360° and deriving a signal indicative of only the excess phase over 360°. Angles may be described and measured in terms of degrees i.e. 0° to 360° or by corresponding radian measure i.e. 0 to $2\pi$ radians.

In the prior art, coil arrangements surrounding the ferrite phase shifter were used to buck the flux to accomplish the modulo $2\pi$ subtraction. Finally, digital adders have also been used in such matrix arrays. This is set forth in FIG. 7 of U.S. Patent 3,274,601 issued on Sept. 20, 1966 to J. Blass.

It is accordingly an object of this invention to devise a beam-steering apparatus which can effect a modulo $2\pi$ phase shift using simplified analog circuit structure.

It is another object of this invention to device a beam-steering apparatus used with phased array antennas. These typically include a matrix having cross-point phase shift elements that sum corresponding row and column beam-steering angle magnitude signals, modulo $2\pi$ the sum to obtain an angle in the range between 0° and 360° and provide an output signal for phase shift purposes proportional to the sum modulo $2\pi$.

It is yet a related object of the invention to device a modulo $2\pi$ angle indicating apparatus in analog circuit configuration.

SUMMARY OF THE INVENTION

The objects of this invention are satisfied in a preferred embodiment in which a beam-steering apparatus is used in combination with a phased array matrix antenna. The apparatus comprises a source of reference signals of frequency $1/T_0$. Also included are means responsive to first beam-steering angle magnitude signals $\phi_R$ for applying corresponding first signals to the matrix rows. Each first signal is proportionally spaced in time by an interval $$t_R = \frac{\phi_R T_0}{2\pi}$$

prior to a given reference signal. Likewise, means responsive to second beam-steering angle magnitude signals $\phi_C$ apply corresponding second signals to the matrix columns. Each second signal is proportionally spaced in time by an interval $$t_C = \frac{\phi_C t_0}{2\pi}$$

after the given reference signal. Lastly, means at each matrix cross-point responsive to the reference signals, first signals and second signals defining a time interval $t_C + t_R$ alter the phase shift of the corresponding matrix antenna element. This is controlled by having the output signals proportional to $\phi R + \phi C$ when $$\frac{t_R + t_C}{T_0} \leq 1$$

and proportional to $\phi_C + \phi_R - 2\pi n$ when $$\frac{t_R + t_C}{T_0} > 1$$

$n$ being any integer and $|\phi_C + \phi_R - 2\pi n| < 2\pi$.

There is in effect a pulse width modulation of each reference pulse proportional to the sum of the angles. The modulo $2\pi$ of the sum is achieved by comparing the modulated pulse width to the period of the reference pulse. If the ratio is greater than 1, then an output pulse of width $T - T_0$ is used to alter the corresponding antenna element phase shift. Significantly, the object of devising a modulo $2\pi$ angle indicating apparatus is likewise satisfied and furthermore is operable even though the frequency of the reference signal is changed. This last aspect arises from relating the pulse width $T$ to $T_0$ by the factor $\phi/2\pi$.

A specific preferred circuit embodiment of the invention shows a driver in combination with a ferrite phase shifter. Since the ferrite phase shifter is a current responsive device, then the driver comprises a current source and means responsive to a pulse train for interconnecting the source to the phase shifter only for the duration of each pulse. This is instrumented by forming the current source from a voltage source in series with coil. A first current path, including the coil and the votlage source, is established only during the pulse duration and a second current path, including the coil, is established during the interpulse interval to maintain the current magnitude in the coil either constant or changeable under control.

BRIEF DESCRIPTION OF THE DRAWINGS

FIGS. 2a–2e show timing diagrams of the pulse width modulation of the reference pulses particularly emphasizing the aspect of the modulated pulse width exceeding the period of the reference pulses;

DESCRIPTION OF THE PREFERRED EMBODIMENTS

Figure 1:
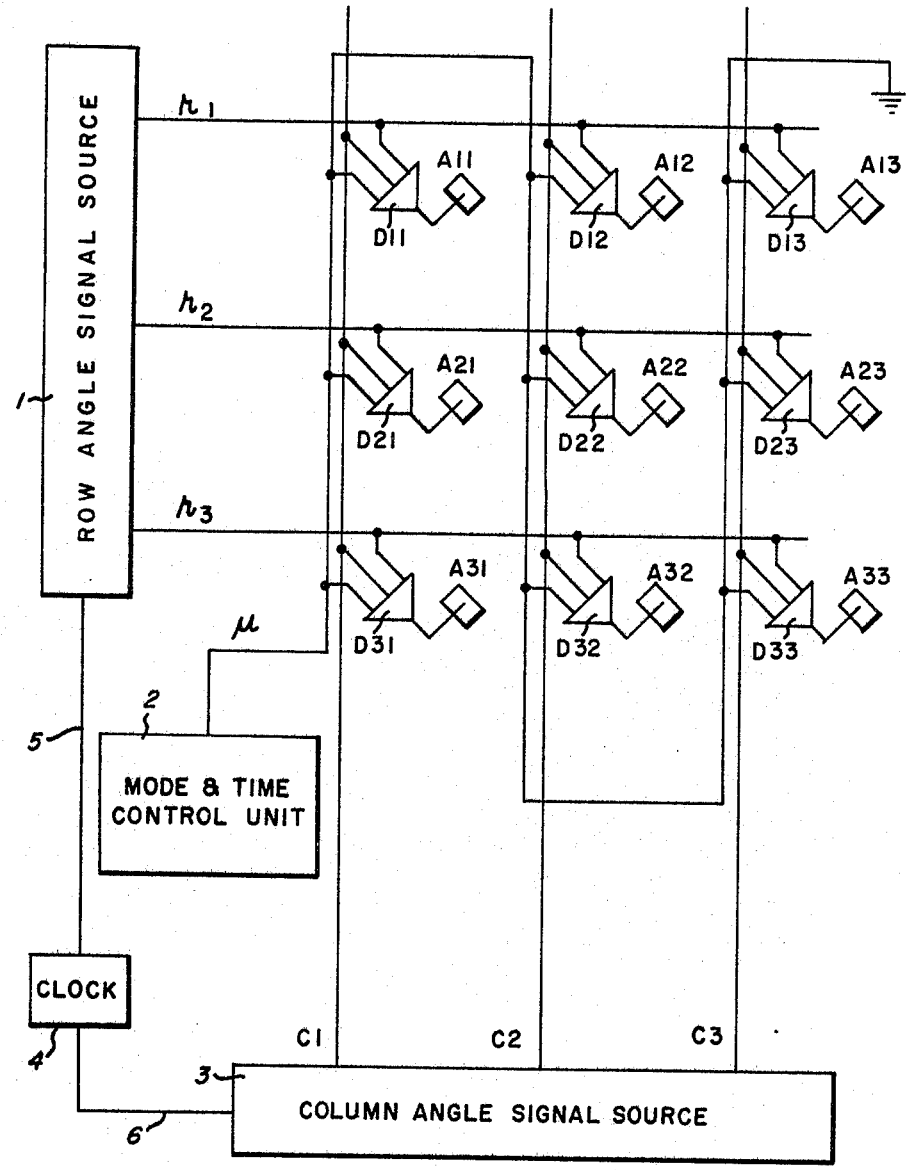
FIG. 1 is a block diagram of the beam-steering apparatus used in combination with a phased matrix array antenna.

FIG. 1 exhibits a beam-steering apparatus in block diagram form in combination with a phased matrix array antenna. A plurality of radiating elements and corresponding phase shifters coupled to them are shown as elements $A_{11}$–$A_{33}$ in matrix array. A plurality of phase shift drivers $D_{11}$–$D_{33}$ intercouple the antenna elements to a corresponding electrical conductor matrix formed by row conductors $r_1$, $r_2$, and $r_3$ and column conductors $c_1$, $c_2$, and $c_3$. The drivers may be considered as the appropriate cross-point elements for the matrix. Each of the matrix row conductors connects a row phase shift angle signal source 1 to a corresponding terminal input on a given driver row. Thus, row conductor $r_1$ couples drivers $D_{11}$, $D_{12}$, and $D_{13}$. Likewise, row conductor $r_3$ couples drivers $D_{31}$, $D_{32}$, and $D_{33}$.

A column phase shift angle signal source 3 couples a second input to corresponding column terminals of the drivers over column conductors $c_1$, $c_2$, and $c_3$. Illustratively, column conductor $c_2$ connects drivers $D_{32}$, $D_{22}$, and $D_{12}$. A mode and time control unit 2 is coupled by conductor $u$. This unit permits the phase shift driver to operate in several modes such as charging, steady state, and dumping.

Functionally, the control unit comprises a switching arrangement and a plurality of voltage sources. A portion of such switching and voltage sources is shown and described with reference to FIG. 3b. The switches interconnect the voltage sources to corresponding inductively loaded phase shift drivers.

Broadly, the switches in the control unit connect the voltage sources to the inductances to put energy into the system at a voltage level consistent with the changing beam pattern. A high voltage minimizes the time for charging the array. Also, the switches connect the inductances and other circuit elements to form a discharge path to take energy out of the system. Lastly, an idling path may be formed in which only sufficient energy is supplied the coil to overcome ohmic losses and keep the current constant.

Also shown in clock 4 which operates as the source of reference signals having a frequency of $1/T_0$. This clock is coupled to the row angle signal source 1 and the column angle signal source 3 over paths 5 and 6 respectively.

Attention is now directed to FIGS. 2a–2e to be considered along with the embodiment illustrated in FIG. 1.

The timing references shown in FIG. 2a having a frequency of $1/T_0$ are simultaneously applied by the clock to the angle signal sources 1 and 3. The angle signal sources each generate simultaneously or otherwise pulse signals on corresponding row or column conductors. Thus, for the row angle signal source 1 pulse signals are applied to row conductors $r_1$, $r_2$, and $r_3$. The signals are applied at a point in time prior to the occurrence of a given reference pulse. This time interval $t_R$ is proportional to the phase shift angle magnitude signal $\phi_R$. In this invention, the interval $t_R$ is set equal to $\phi_R T_0/2\pi$. In normal operation, $\phi_R$ and $\phi_C$ will vary between 0 and $2\pi$. However, the magnitude of $\phi_R$, or for that matter $\phi_C$, may in steady state have any value. Thus, if $\phi_R$ was equal to $3\pi$ radians, then $t_R$ would be equal to $3T_0/2$. It is emphasized again that the interval $t_R$ may represent different values as applied to each row conductor.

Column phase shift angle signal source 3 impresses corresponding signals shown in FIG. 2c spaced in time after the reference pulse upon corresponding column conductors $c_1$, $c_2$, and $c_3$. The time interval $t_C$ is proportional to a corresponding phase shift angle signal magnitude of $\phi_C$. The interval is set equal to $\phi_C T_0/2\pi$. This interval may be of different magnitude upon each conductor. Each of the time intervals determined by the row and column signals is combined at a corresponding crosspoint device. Thus, an interval $t_R$ impressed on row conductor $r_2$ and an interval $t_C$ impressed on column conductor $c_3$ would be summed as is shown in FIG. 2d at cross-point driver $D_{23}$ in FIG. 1.

In FIG. 2e the sum of the intervals as represented by the row and column phase shift angle signals which exceed $2\pi$ is set forth. This illustrates the modulo $2\pi$ effect. It should be noted that the resulting signal is the sum $t_R+t_C-T_0$.

Figure 3A:
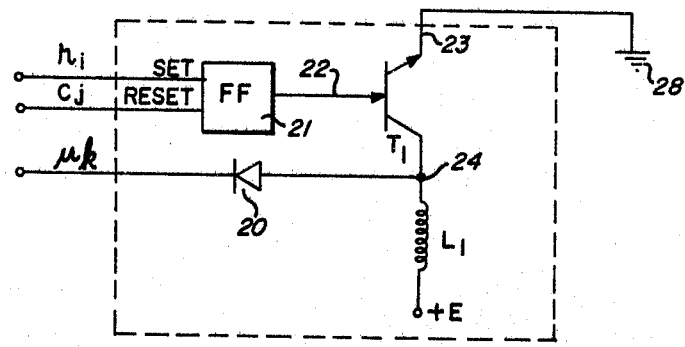
FIG. 3A shows a block diagram of the phase shift driver constituting a portion of the cross-point elements $D_{11}$–$D_{33}$ in the matrix shown in FIG. 1.

FIG. 3A shows a general embodiment of the phase shift driver according to the invention. In FIG. 1, the antenna and shift element is represented symbolically by $A_{ij}$. The coil $L_1$ in FIG. 3A represents a portion of the input to the phase shifter. Coil $L_1$ is driven by transistor $T_1$ and is coupled to the collector electrode. The transistor emitter electrode is terminated at ground 28 through conductor 23. Flip flop 21 drives the transistor base over conductor 22. The flip flop SET input is coupled to the ith row conductor. The RESET flip flop input is coupled to the jth column conductor.

Operationally, the row signal sets flip flop 21 which drives transistor $T_1$ into saturation. This electrically couples the coil $L_1$ to the transistor. The signal upon the corresponding column activates the RESET input which turns the transistor off. After the transistor is turned off, the current path including diode 20 can be used to discharge the coil current or recirculate it through the coil and an appropriate voltage source.

Figure 3B:
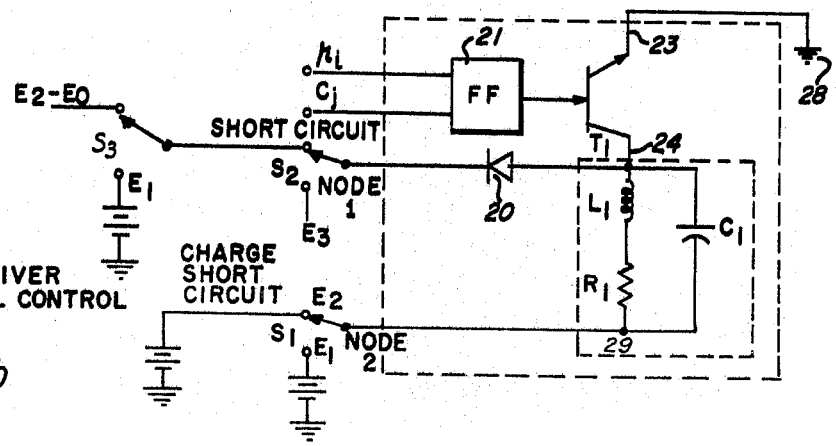
FIG. 3B shows the phase shift driver exhibiting the means for maintaining control of the current source.

Referring now to FIG. 3b there is shown a modified phase shift network of the type set forth in FIG. 3a. This network is shown with an external control arrangement. In this regard, it should be recalled that the electrical phase $\phi$ is proportional within limits to current I passing through the coil $L_1$. Thus, in order to alter phase, current charges the coil. Also, in order to maintain phase constant, current must be maintained constant through the coil. Lastly, in order to reset the coil current to zero phase prior to charging through the coil, the present current must be discharged. These three modes are respectively called charge, steady state and dump or reset.

Phase shift driver coil $L_1$ is placed in parallel with a capacitance $C_1$. Coil resistance $R_1$ is shown as a resistor in series with $L_1$. The $L_1 C_1$ load is driven in the collector circuit 24 of transistor $T_1$. The transistor emitter 23 is grounded at junction 28. Flip flop 21 drives $T_1$ through its base. The two input terminals to flip flop 21 are correspondingly coupled to a row $r_i$ and column $c_j$ input of the matrix shown in FIG. 1.

One end of the coil $L_1$ joins diode 20 at collector 24. The other end 29 of coil $L_1$ is terminated at node 2 on switch $S_1$. $S_1$ terminates two batteries $E_1$ and $E_2$ at respective switch positions. Similarly, diode 20 drives node 1 of switch $S_2$. Two batteries $E_2-E_0$ and $E_1$ terminate corresponding $S_2$ switch positions.

It is known from Lenz's law that $$i(t) = \int^T E(t) dt$$

Now in the charging mode for a final current I and a given DC voltage E, then $$I = E \Delta t \text{ or } \Delta t = \frac{I}{E}.$$

Restated, the voltage E determines the time $\Delta t$ required to achieve the final current I. Thus, voltage $E_1$ is applied on conductor 29 across coil $L_1$.

To maintain current through $L_1$ in the "steady state" mode, the DC voltages $E_2$ and $E_2-E_0$ ($E_0 \approx 0$) are applied at nodes 1 and 2 across $L_1$. $E_2$ is selected such that $E_2/R_1$ is the current for maximum phase shift. An average current of $E_2D/R_1$ in coil $L_1$ will be produced if the transistor $T_1$ is periodically driven into saturation with a duty cycle D.

In order to reset the driver and "dump" current in coil $L_1$, DC voltages $E_2$ and $E_3$ are applied at nodes 1 and 2. However, $E_3 \approx 1.1 E_1$. Now, when $T_1$ is open circuited the inductive EMF rises to $E_3-E_2$. The coil current falls at the rate of $E_3-E_2/L_1$. The current will continue to fall at this rate until the coil is discharged. This occurs provided the coil does not have a shorted turn.

Figure 4A:
FIG. 4A is a simplified circuit diagram of the phase shifter coil with a shorted turn.
Figure 4B:
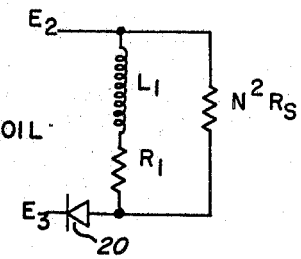
FIG. 4B is an equivalent circuit of the circuit shown in FIG. 4A.

Referring now to FIG. 4a of the drawing there is shown a coil $L_1$ with a shorted turn. This coil is equivalent to a transformer having a secondary terminating in a resistance $R_s$. In FIG. 4b there is shown an equivalent circuit of the coil with shorted turn set forth in FIG. 4a. In this circuit the secondary load resistance $R_s$ is reflected back into the primary as a parallel impedance of $N^2 R_s$ where N is the number of shorted turns and $R_s$ their ohmic value.

In the dump mode diode 20 disconnects $L_1$ from the voltage sources whenever the current is less than $$\frac{E_3-E_2}{R_s}$$

Below this value the decay is determined by $L_1/R_s$.

Figure 4C:
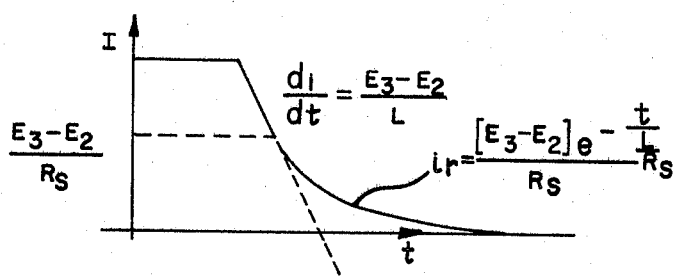
FIG. 4C exhibits the current versus time coil discharge with shorted turn characteristic.

Referring now to FIG. 4c there is shown a graph depicting the current discharge of a coil shown in FIG. 4a as a function of time $t$. The initial discharge rate $$\frac{di}{dt} = \frac{E_3-E_2}{L_1}.$$

Below the magnitude $$\frac{E_3-E_2}{R_s}$$

then $$i = \left[\frac{E_3-E_2}{R_s}\right] e - \frac{t}{L_i/R_s}.$$

In summary, a beam-switching apparatus in combination with a phased array antenna has been shown in which phased array antenna has been shown in which phased shift angle magnitude signals have been used to pulse width modulate reference signals having a predetermined frequency. A modulo $2\pi$ angle indication necessary for efficient beam-switching operation has been instrumented in an embodiment using a ferrite phase shifter driver by a current source connectable to the phase shifter in response to and for the duration of the width of an applied pulse. This is of particular use in a matrix antenna array in which the amount of phase shift is determined by summing information from row and column conductors and driving the phase shifter between 0° to 360°. This also occurs when the sum exceeds 360° by subtracting modulo $2\pi$ from the sum.

What is claimed is:
1. A beam-steering apparatus in combination with a phased array matrix antenna comprising:
   a source of reference signals of frequency $1/T_0$;
   means responsive to first phase shift angle magnitude signals $\phi_R$ for applying corresponding first signals to the matrix rows, each first signal being proportionally spaced in time by an interval $t_R$ equal to $\phi_R T_0/2\pi$ prior to a given reference signal;
   means responsive to second phase shift angle magnitude signals $\phi_C$ for applying corresponding second signals to the matrix columns, each second signal being proportionally spaced in time by an interval $t_C$ equal to $\phi_R T_0/2\pi$ after the given reference signal;
   means at each matrix cross-point responsive to first signals and second signals, which define a time interval $t_R+t_C$, for alterning the phase shift of the corresponding matrix antenna elements with output signals proportional to $\phi_R+\phi_C$ when

$$\frac{t_R+t_C}{T_0} \leq 1$$

and proportional to $\phi_C+\phi_R-2\pi$ when $$\frac{t_R+t_C}{T_0} > 1$$

$n$ being any positive integer and $|\phi_C+\phi_R-2\pi n|<2\pi$.
2. A beam-steering apparatus according to claim 1, characterized in that
   the means at each matrix cross-point for altering the phase shift of the corresponding matrix antenna element comprise:
      a current responsive phase shifter;
      a source of current; and
      means responsive to each first signal for connecting the source of current to the phase shifter and further responsive to each second signal for disconnecting the source of current from the phase shifter.

References Cited

UNITED STATES PATENTS 3,345,631  10/1961  Chamberlin _____ 343—100

RODNEY D. BENNETT, JR., Primary Examiner

T. H. TUBBESING, Assistant Examiner

U.S. Cl. X.R.

343—854